Sept. 29, 1942.   C. F. DERLETH   2,297,348
HEAT TREATING OF MILK PRODUCTS
Filed Aug. 28, 1941
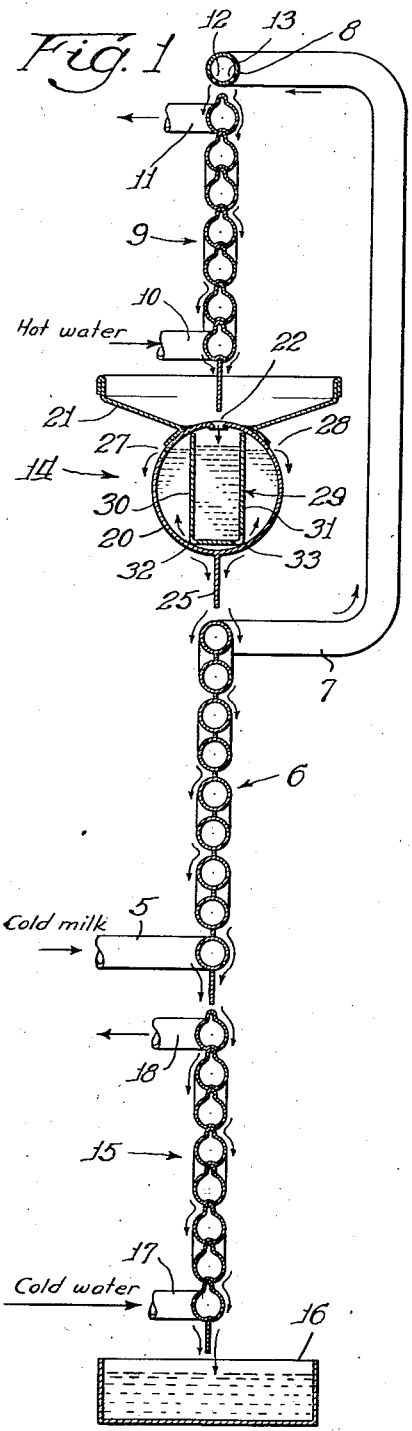
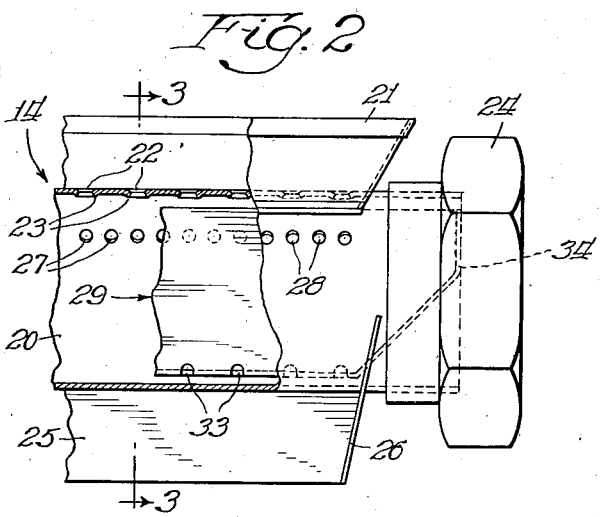
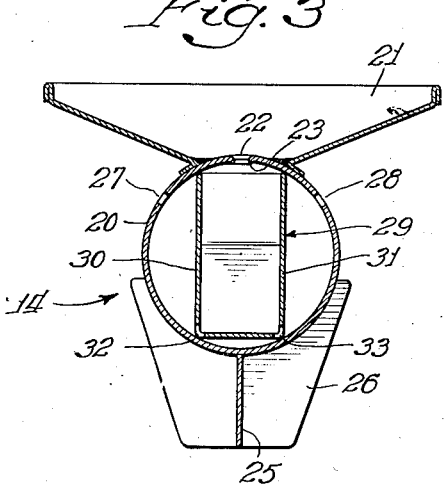
Inventor:
Clark F. Derleth
By
Bakel Carlson Wrightough & Wells
Attys.

Patented Sept. 29, 1942

2,297,348

UNITED STATES PATENT OFFICE 2,297,348

HEAT TREATING OF MILK PRODUCTS

Clark F. Derleth, Watertown, Wis., assignor to Kusel Dairy Equipment Co., Watertown, Wis., a corporation of Wisconsin Application August 28, 1941, Serial No. 408,641

8 Claims. (Cl. 299—58)

The present invention relates to pasteurizing equipment for milk, and is particularly directed to a novel unit for use in a regenerative pasteurizer or similar heat treating device, whereby it is possible to hold the milk during the heat treatment at a substantially uniform temperature for the desired period of time.

The preferred form of the invention is embodied in a regenerative pasteurizer of the type wherein the milk to be heated is first passed through a series of coils over which the already pasteurized milk flows. The milk to be heated then is caused to flow down over a series of steam heated coils, in order to bring the temperature of the milk to the desired high point. For certain purposes, particularly for the making of cheese, the length of time the milk is held at the high temperature is very important. The principal purpose of the present invention is to provide a device adapted to receive the milk at the high temperature and to assure that every part of it will be held for the required length of time before the cooling process takes place. The particular construction and features of novelty of the device embodied in my invention will appear more fully from the following description and the accompanying drawing. It is to be understood, however, that the drawing and description are illustrative only and should not be taken as limiting the invention except insofar as it is limited by the claims.

In the drawing—

Fig. 1 is a somewhat diagrammatic vertical section through a regenerative pasteurizer embodying my invention;

Fig. 2 is an enlarged fragmentary view, partly in full and partly in section, illustrating the holding tube construction which embodies my invention; and Fig. 3 is a sectional view taken on the line 3—3 of Fig. 2.

Referring now in detail to the drawing, the present invention is embodied in a regenerative pasteurizer system which is particularly adapted for pasteurizing milk for cheese making. In such pasteurization it is desirable to hold the milk at a particular temperature, usually about 160° F. for a brief period of fifteen to thirty seconds. In the present device means are provided whereby this holding period is accurately controlled, and the temperature of the milk can be maintained with very little drop during the holding period without the necessity of large or cumbersome storage devices.

In Fig. 1 there is shown a vertical section through a regenerative system wherein the numeral 5 indicates an inlet pipe for the cold milk to a bank 6 of tubes, the tubes being connected in series so that the milk entering at 5 will follow back and forth through these tubes to a discharge pipe 7 at the top of the bank of tubes 6. The discharge pipe 7 leads to a distributor pipe 8, which is placed above a bank 9 of heating tubes that are adapted to receive hot water from a suitable source not shown. A hot water inlet 10 enters the bank 9 at the bottom thereof, and a hot water outlet 11 is provided at the upper end of the bank 9. The distributor tube 8 is provided with two rows of apertures 12 and 13, whereby milk is discharged down over the heating tubes that make up the bank 9.

Below the bank 9 of heating tubes the milk enters a holding device 14, and from this holding device the milk is eventually discharged down over the bank of tubes 6, so as to impart a part of its heat to the incoming milk and thus forewarm it. In this fashion incoming milk is partially warmed, and serves as a means for partially cooling the pasteurized milk. The pasteurized milk then flows down over cooling coils 15 into a holding tank 16, from which it may be withdrawn for the making of cheese or any other purpose. The cooling coils 15 are, of course, supplied with a suitable cooling liquid, such as cold water. An inlet 17 and an outlet 18 provide for the circulation of cold water through the coils 15.

The present invention is embodied in the holding device 14. This device is so constructed that the milk coming from the lowermost part of the bank of tubes 9, and thus being at its highest temperature, can be held at substantially this high temperature for the desired period of time. The holding device 14 comprises a tube 20 with a trough 21 attached to the top thereof by welding or some other suitable method. The tube 20 is provided with a row of apertures 22 directly below the heating tubes 9. These apertures are formed by drilling the holes, then punching them slightly so as to form a downturned drip edge 23 around each aperture. The ends of the tube 20 are sealed and supported by suitable caps such as that indicated at 24 in Fig. 2. The tube 20 also has a depending flow flange 25, and at its ends it is provided with drip aprons 26, one of which is shown in Figs. 2 and 3. It is to be understood that the associated parts attached to the holding tube are provided at both ends substantially as they are shown in Fig. 2.

The tube 20, in addition to the apertures 22, has a row of apertures 27 outside the trough 21 extending lengthwise along one side of the tube just below the trough. The tube has another row of apertures 28 opposite the row of apertures 27, so that milk may flow out through the apertures 27 and 28 and down over the outside of the tube 20 to the flange 25.

Within the tube 20 there is a U-shaped channel 29, the sides 30 and 31 of which extend from a point adjacent the bottom of the tube 20 where they engage and rest on the tube wall upward until they meet the wall of the tube at the top thereof. At the bottom of the channel 29 there are two rows of apertures 32 and 33. The channel 29 is secured in the tube 20 by end portions 34, one of which is shown in Fig. 2, these end portions being secured in any suitable fashion to hold the channel 29 in the position shown with respect to the tube 20. The apertures 27 and 28 are spaced below the top of the channel 29 so that they maintain the level of the milk below the top of the channel.

In operation the heated milk which is discharged into the trough 21 follows quickly into the channel 29; but before it can escape from the channel 29 it must flow downwardly to the apertures 32 and 33. From the apertures 32 and 33 the milk flows upwardly to the apertures 27 and 28 and thence downwardly over the outside of the tube 20. Thus the channel 29 is substantially surrounded at all times by the milk flowing out of the bottom of the channel. The hot milk coming in at the top of the channel is therefore maintained at a temperature which is, for all practical purposes, constant for the period of time necessary to empty the channel 29. This particular channel and tube arrangement provides a very simple means for holding the milk at its highest temperature for the desired length of time. For a given size of holding tube 20, the holding time is directly dependent upon the rate at which milk is fed to the holding tube up to the maximum capacity for which the tube is designed. The level of milk in the channel 29 will, of course, remain substantially at the level of the openings 27 and 28, or slightly above this level. Any milk that flows into the top of the channel 29 forces an equivalent amount of milk out through the bottom apertures 32 and 33; so that the movement of the milk is progressively downward through the channel 29. The temperature loss of the milk between the tubes 9 and the channel 29 is comparatively slight, since this loss is only that which would take place while the milk is passing through the apertures 22. These apertures are preferably provided in such quantity and size as to prevent the accumulation of any substantial amount of milk in the trough 21.

From the foregoing description it is thought that the construction and advantages of the holding device will be clearly apparent to those skilled in this art. Having thus described my invention, what I claim as new and desire to secure by Letters Patent is:

1. In a heat treating apparatus for liquids, a device for keeping the temperature of the heated liquid substantially constant for a predetermined time, said device comprising a horizontally running tube apertured at the top to permit the heated liquid to flow directly into it from a source above, a channel in said tube receiving the liquid directly as it falls into the tube, said channel having outlet means at the bottom thereof to enable the liquid falling therein to flow out into the tube, and said tube having its outlet near the top of the channel.

2. In a heat treating apparatus for liquids, a device for keeping the temperature of the heated liquid substantially constant for a predetermined time, said device comprising a horizontally running tube apertured at the top to permit the heated liquid to flow directly into it from a source above, a channel in said tube receiving the liquid directly as it falls into the tube and having apertures spaced along the bottom thereof to enable the liquid falling therein to flow out into the tube, and said tube having rows of apertures therein adjacent the top level of the channel whereby the liquid may flow out and down over the sides of the tube.

3. In a heat treating apparatus for liquids, a device for keeping the temperature of the heated liquid substantially constant for a predetermined time, said device comprising a horizontally running tube apertured at the top to permit the heated liquid to flow directly into it from a source above, a channel in said tube receiving the liquid directly as it falls into the tube, said channel having outlet means at the bottom thereof to enable the liquid falling therein to flow out into the tube, and said tube having its outlet near the top of the channel, said channel being U-shaped and resting on the bottom of the tube.

4. In a heat treating apparatus for liquids, a device for keeping the temperature of the heated liquid substantially constant for a predetermined time, said device comprising a horizontally running tube apertured at the top to permit the heated liquid to flow directly into it from a source above, a channel in said tube receiving the liquid directly as it falls into the tube, said channel having outlet means at the bottom thereof to enable the liquid falling therein to flow out into the tube, and said tube having its outlet near the top of the channel, said tube having depending drip edges surrounding the inlet apertures whereby to direct the liquid down into the channel.

5. In a heat treating apparatus for liquids, a device for keeping the temperature of the heated liquid substantially constant for a predetermined time, said device comprising a horizontally running tube apertured at the top to permit the heated liquid to flow directly into it from a source above, a channel in said tube receiving the liquid directly as it falls into the tube and having apertures spaced along the bottom thereof to enable the liquid falling therein to flow out into the tube, and said tube having rows of apertures therein adjacent the top level of the channel whereby the liquid may flow out and down over the sides of the tube; the lower corners of said channel resting on the bottom of the tube, and the outlets from the channel into the tube being located at the corners.

6. In a heat treating apparatus for fluids, a device for keeping the temperature of the heated fluid substantially constant for a predetermined time, said device comprising a horizontally running tube; an elongated pan thereon for holding the heated liquid; said tube being apertured along the top to pass the liquid from the pan to the interior of the tube; an elongated channel in the tube having an open top directly beneath the apertures in the tube to enable the liquid to pass directly into the channel, the side and bottom walls of said channel being spaced from the tube, said channel having bottom apertures to enable the hot fluid falling therein to flow out into the side spaces between it and the tube, and said tube having outlets near the top thereof but below the top edge of the channel and at opposite sides of the channel whereby the liquid entering the tube through the top apertures must first pass downwardly through the channel and then upwardly through the side spaces to escape from the tube.

7. In a heat treating apparatus for fluids, a device for keeping the temperature of the heated fluid substantially constant for a predetermined time, said device comprising a horizontally running tube, an elongated pan thereon for holding the heated liquid, said tube being apertured along the top to pass the liquid from the pan to the interior of the tube, an elongated channel in the tube having an open top directly beneath the apertures in the tube to enable the liquid to pass directly into the channel, the side and bottom walls of said channel being spaced from the tube, said channel having bottom apertures to enable the hot fluid falling therein to flow out into the side spaces between it and the tube, and said tube having outlets near the top thereof but below the top edge of the channel and at opposite sides of the channel whereby the liquid entering the tube through the top apertures must first pass downwardly through the channel and then upwardly through the side spaces to escape from the tube, and said tube having a drip fin on the exterior thereof extending lengthwise along the bottom, and splash aprons at the opposite ends of the tube.

8. In a heat treating apparatus for fluids, a device for keeping the temperature of the heated fluid substantially constant for a predetermined time, said device comprising a horizontally running cylindrical tube having a row of apertures in the top thereof with depending lips around said apertures, a channel in said tube extending substantially lengthwise thereof, said channel being substantially U-shaped and the vertical depth of said channel being slightly less than the internal diameter of the tube whereby the lower edges of the channel rest upon the tube and the top edges are in juxtaposition to the tube surface, said channel having oppositely disposed outlets at the lower corners thereof for directing liquid into the side spaces between the channel and the tube, and said tube having oppositely disposed outlet means adjacent the top thereof but below the top of the channel whereby the liquid entering the tube must first pass downwardly through the channel, then upwardly between the channel and the tube, and then down over the outside of the tube.

CLARK F. DERLETH.